United States Patent
Faulk, Jr.

(10) Patent No.: US 9,590,897 B1
(45) Date of Patent: Mar. 7, 2017

(54) METHODS AND SYSTEMS FOR NETWORK DEVICES AND ASSOCIATED NETWORK TRANSMISSIONS

(71) Applicant: QLOGIC Corporation, Aliso Viejo, CA (US)

(72) Inventor: Robert Lee Faulk, Jr., Roseville, CA (US)

(73) Assignee: QLOGIC Corporation, Aliso Viejo, CA (US)

( * ) Notice: Subject to any disclaimer, the term of this patent is extended or adjusted under 35 U.S.C. 154(b) by 230 days.

(21) Appl. No.: 14/632,200

(22) Filed: Feb. 26, 2015

(51) Int. Cl.
*G06F 17/30* (2006.01)
*H04L 12/725* (2013.01)
*H04L 12/743* (2013.01)

(52) U.S. Cl.
CPC ................................ *H04L 45/3065* (2013.01)

(58) Field of Classification Search
CPC ... H04L 45/7453; H04L 45/00; H04L 45/745; H04L 45/10; H04L 45/30; H04L 45/38; H04L 45/72; H04L 45/74; H04L 49/901; H04L 49/253; H04L 63/0254; H04L 63/0263; H04L 63/0227; H04L 69/22; H04L 12/28; H04L 12/4645; H04L 43/028; H04L 47/10; H04L 47/2441; H04L 47/20; G06F 17/30982; G06F 17/30949; G06F 12/0246; G06F 12/30097; G06F 12/3012; G06F 12/30955; G06F 12/30864; G06F 12/30985
USPC .............. 711/108, 216; 370/389; 726/13, 1; 707/999.003, 999.006; 709/224, 238
See application file for complete search history.

(56) References Cited

U.S. PATENT DOCUMENTS

| | | | | |
|---|---|---|---|---|
| 7,382,637 | B1* | 6/2008 | Rathnavelu | G11C 15/00 365/189.05 |
| 7,636,717 | B1* | 12/2009 | Gupta | G06F 17/30985 |
| 7,903,554 | B1* | 3/2011 | Manur | H04L 45/026 370/230.1 |
| 9,269,439 | B1* | 2/2016 | Levy | G11C 15/00 |
| 9,473,502 | B2* | 10/2016 | Basso | H04L 63/101 |
| 9,485,257 | B2* | 11/2016 | Basso | H04L 63/101 |
| 2003/0048785 | A1* | 3/2003 | Calvignac | G11C 15/00 370/392 |
| 2003/0208657 | A1* | 11/2003 | Stark | G06F 17/30982 711/108 |
| 2003/0210689 | A1* | 11/2003 | Davis | H04L 45/745 370/389 |

(Continued)

OTHER PUBLICATIONS

"OpenFlow Switch Specification", Oct. 14, 2013, Version 1.4.0, Open Networking Foundation.

*Primary Examiner* — Alina N Boutah
(74) *Attorney, Agent, or Firm* — Klein, O'Neill & Singh, LLP

(57) ABSTRACT

Methods and systems for optimizing data structures to efficiently control network data transfers are provided. For example, the method includes determining common key type sets from a plurality of network processing rules; creating one or more hash data structures using the most common key type sets; programming network processing rules that use the most common key type sets into the one or more hash data structures; programming remaining network processing rules into a content addressable memory (CAM); and using the one or more hash data structures and the CAM to find an appropriate network processing rule to process a network packet.

18 Claims, 8 Drawing Sheets

(56) References Cited

U.S. PATENT DOCUMENTS

| | | | |
|---|---|---|---|
| 2004/0205292 A1* | 10/2004 | Lu | H04L 45/7453 711/108 |
| 2006/0072565 A1* | 4/2006 | Yazaki | H04L 12/64 370/389 |
| 2006/0248095 A1* | 11/2006 | Cozzani | H04L 45/00 |
| 2007/0115986 A1* | 5/2007 | Shankara | H04L 63/145 370/392 |
| 2007/0280258 A1* | 12/2007 | Rajagopalan | H04L 45/245 370/395.3 |
| 2008/0192754 A1* | 8/2008 | Ku | H04L 45/00 370/395.32 |
| 2011/0060876 A1* | 3/2011 | Liu | G06F 17/30949 711/108 |
| 2012/0134266 A1* | 5/2012 | Roitshtein | H04L 47/125 370/230 |
| 2013/0042060 A1* | 2/2013 | Marukame | G06F 17/30982 711/108 |
| 2013/0198445 A1* | 8/2013 | Bando | G11C 15/04 711/108 |
| 2013/0242996 A1* | 9/2013 | Varvello | H04L 67/327 370/392 |
| 2014/0006706 A1* | 1/2014 | Wang | H04L 49/901 711/108 |
| 2014/0241359 A1* | 8/2014 | Bosshart | H04L 45/74 370/392 |
| 2014/0321462 A1* | 10/2014 | Kancherla | H04L 45/72 370/389 |
| 2015/0033251 A1* | 1/2015 | Koo | H04N 21/26613 725/31 |
| 2015/0039823 A1* | 2/2015 | Chen | G06F 17/30982 711/108 |
| 2015/0121035 A1* | 4/2015 | Steele, Jr. | G06F 12/1018 711/216 |
| 2015/0127900 A1* | 5/2015 | Dharmapurikar | G11C 15/04 711/108 |
| 2015/0242429 A1* | 8/2015 | Varvello | H04L 45/7453 707/752 |
| 2015/0341364 A1* | 11/2015 | Basso | H04L 63/101 711/108 |
| 2015/0358290 A1* | 12/2015 | Jain | H04L 63/0263 711/108 |
| 2016/0112319 A1* | 4/2016 | Hasani | H04L 45/748 370/392 |
| 2016/0134537 A1* | 5/2016 | Huynh | H04L 45/7457 709/238 |
| 2016/0142316 A1* | 5/2016 | Wang | H04L 45/54 370/392 |
| 2016/0212150 A1* | 7/2016 | Thubert | H04L 63/126 |

* cited by examiner

| Index | Src IP | Dst IP | App Port | Actions | Notes |
|---|---|---|---|---|---|
| 0 | * | * | 100 | Deny | No one allowed on app port 100. |
| 1 | * | 142.3.2.3 | * | Deny | Blacklisted destinations. No one can talk to these destinations. There is a rule for each blacklisted address. These rules will share the Hash1 common key set, and will be marked with match priority 1. |
| ... many entries ... | * | ...many... | * | Deny | |
| 1000 | * | 13.3.5.9 | * | Deny | |
| 1001 | 10.1.1.3 | * | * | Permit | Administrators. Administrators can access any site other than blacklisted sites or port 100. There is a rule for each administrator. These rules will share the Hash2 common key set with employee rules, but will be marked with match priority 1. Although this example shows permit for all entries, the action can be different for each entry of a common key priority set. |
| ... many entries ... | ...many... | * | * | Permit | |
| 2000 | 10.3.2.78 | * | * | Permit | |
| 2001 | * | * | 80 | Deny | Block employees from port 80. |
| 2002 | 14.3.2.96 | * | * | Permit | Employees can access any site other than port 100, blacklisted sites, or port 80. Employee rules will share the Hash2 common key set with administrator rules, but will be marked with match priority 2. |
| ... many entries ... | ...many... | * | * | Permit | |
| 3000 | 10.3.85.48 | * | * | Permit | |
| 3001 | * | * | * | Deny | Block anything else. |

| Dst IP (input) | Hash1 Match Priority (output) | Actions (output) |
|---|---|---|
| 142.3.2.3 | 1 | Deny |
| ...many rows using dst_ips of rules 2-999... | 1 | Deny |
| 13.3.5.9 | 1 | Deny |

| Src IP (input) | Hash2 Match Priority (output) | Actions (output) |
|---|---|---|
| 10.1.1.3 | 1 | Permit |
| ...many rows using IPs from rules 1002-1999... | 1 | Permit |
| 10.3.2.78 | 1 | Permit |
| 142.3.2.96 | 2 | Permit |
| ...many rows using IPs from rules 2003-2999... | 2 | Permit |
| 10.3.85.48 | 2 | Permit |
| 142.3.2.3 | 2 | Permit |

| Index | App Port | Hash1 Match Priority | Hash2 Match Priority | Actions | Notes |
|---|---|---|---|---|---|
| 0 | 100 | * | * | Deny | No one allowed on app port 100. |
| 1 | * | 1 | * | Deny | Blacklisted destinations. |
| 2 | * | * | 1 | Use Hash2 actions | Administrators. |
| 3 | 80 | * | * | Deny | Block employees from port 80. |
| 4 | * | * | 2 | Use Hash2 actions | Employees |
| 5 | * | * | * | Deny | Block anything else. |

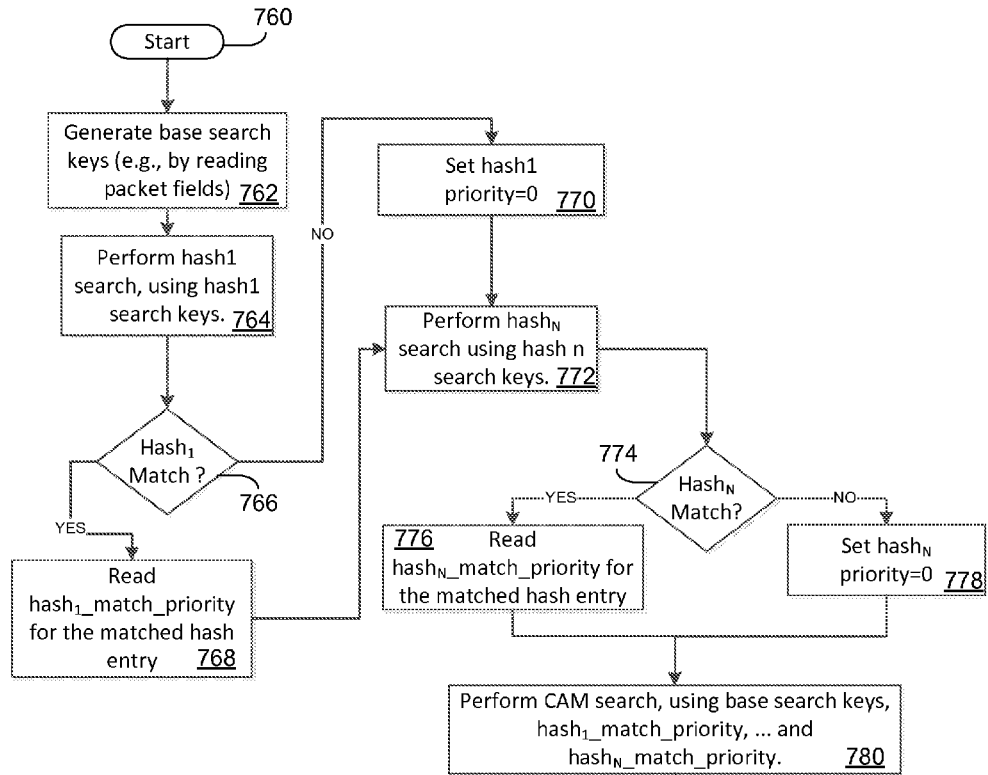
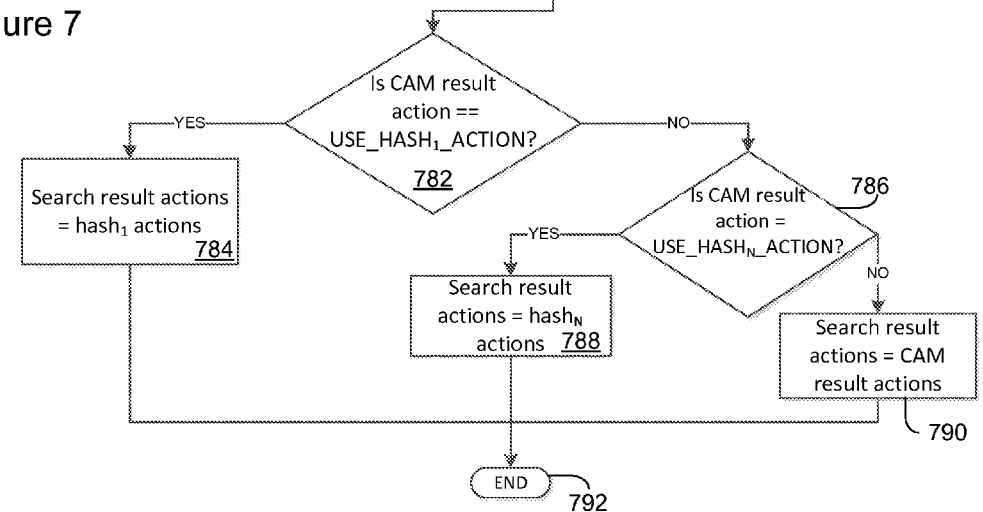
Figure 7

METHODS AND SYSTEMS FOR NETWORK DEVICES AND ASSOCIATED NETWORK TRANSMISSIONS

BACKGROUND

Technical Field

The present embodiments relate to networks and more particularly, to network devices.

Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication. Continuous efforts are being made to improve network communications.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one aspect, a machine-implemented method for processing network packets is provided. The method includes determining common key type sets from a plurality of network processing rules; creating one or more hash data structures using the most common key type sets; programming network processing rules that use the most common key type sets into the one or more hash data structures; programming remaining network processing rules into a content addressable memory (CAM); and using the one or more hash data structures and the CAM to find an appropriate network processing rule to process a network packet.

In another aspect, a network device for processing network transmissions is provided. The device includes a processing module for processing the network transmission; a content addressable memory (CAM); and a memory type different from the CAM for storing a set of one or more hash data structures, the one or more hash data structures outputting hash data structure priority values and action indications. The CAM and the one or more hash data structures share a network transmission processing rule set. The processing module searches the set of one or more hash data structures and uses the output hash data structure priority values to search the CAM to determine how to handle the network transmission and processes the network transmission according to the determination.

In yet another aspect, a machine-implemented method for processing a network transmission is provided. The method includes accepting an incoming network transmission at a network device, the network transmission including one or more packet fields; generating packet search keys based on the one or more packet fields; performing a search of a first hash data structure using at least some of the packet search keys as defined by the first hash data structure and reading a match priority when there is a hash data structure match; searching a content addressable memory (CAM) using at least the match priority as an input; and processing the network transmission according to the result of the CAM search.

This brief summary has been provided so that the nature of the invention may be understood quickly. A more complete understanding of the present disclosure can be obtained by reference to the following detailed description of the preferred embodiments thereof concerning the attached drawing.

BRIEF DESCRIPTION OF THE DRAWINGS

The various present embodiments now will be discussed in detail with an emphasis on highlighting the advantageous features. These embodiments depict the novel and non-obvious network devices having configurable receive packet queues and related methods shown in the accompanying drawings, which are for illustrative purposes only. These drawings include the following figures, in which like numerals indicate like parts:

FIG. 4 is an example of a conventional rule processing data structure used in a network device;

FIGS. 5A-5B are examples of hash data structures in accordance with the teachings of the present disclosure;

FIG. 5C is an example of an efficient flow data structure in accordance with the teachings of the present disclosure;

FIG. 7 is a flow diagram for processing network packets according to the various aspects of the present disclosure.

DETAILED DESCRIPTION

Figure 1:
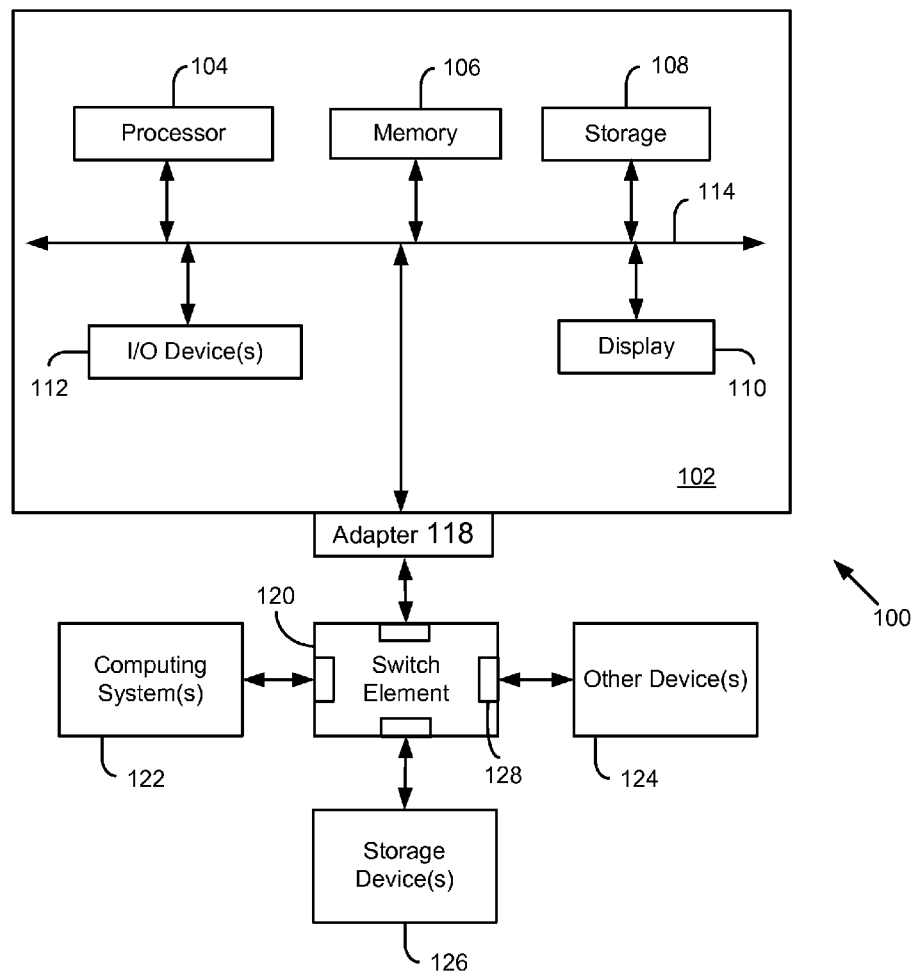
FIG. 1 is a functional block diagram of a system in which the various aspects of the present disclosure may be used.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media may also encompass transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be non-transitory, computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use high speed Ethernet networks while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

System 100:

FIG. 1 shows an example of a system 100 that may be used in connection with the present embodiments. System 100 may include a computing system 102, which may be referred to as a host system or a host computing system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices).

The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices. The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes an adapter (may also be referred to as network interface or network adapter) 118 for communicating with other computing systems 122, storage devices 126, and other devices 124 via a switch 120 and various links. The adapter 118 may comprise a network interface card (NIC) or any other device for facilitating communication between the host system 102, other computing systems 122, storage devices 126, and other devices 124. The adapter 118 may include a converged network adapter, for processing information complying with storage and network protocols, for example, Fibre Channel and Ethernet. As an example, the adapter 118 may be a FCoE adapter. In another embodiment, the adapter 118 may be a host bus adapter, for example, a Fibre Channel host bus adapter.

In one embodiment, processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. adapter 118 of host system 102 and at an adapter (not shown) for the storage devices 126. Fabric ports are typically located in Fabric devices, such as the switch 120.

Figure 2:
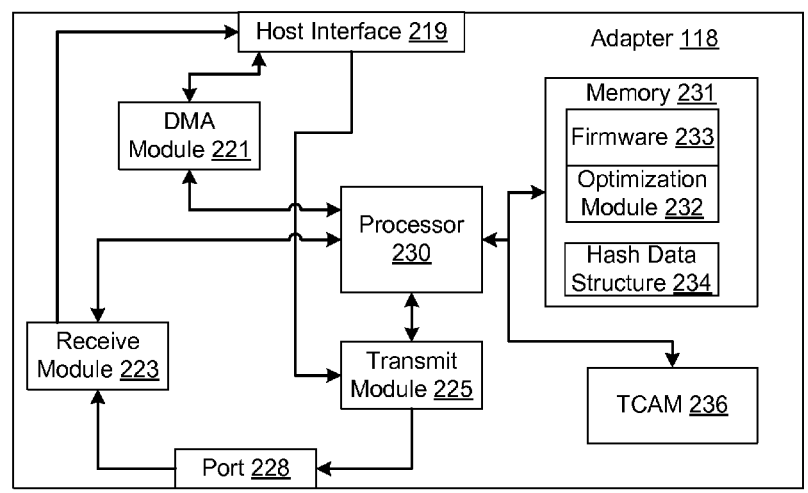
FIG. 2 is a functional block diagram of a network adapter, used according to the various aspects of the present disclosure.

Adapter 118:

FIG. 2 is a high-level block diagram of the adapter 118, according to one aspect of the present disclosure. Adapter 118 illustrates aspects of the present disclosure, but it is important to note that other network devices, such as switch element 120 or routers may also implement the optimization and network processing techniques described herein. As illustrated, in one aspect, adapter 118 includes a host interface 219 for communicating with host system 102, a direct memory access (DMA) module 221, a receive module 223, a transmit module 225, a port 228, a processor 230, a memory 231, and a ternary content addressable memory (TCAM) 236. TCAM 236 size is optimized because it is used to store an optimized flow rule sets, as described below in detail. Therefore, TCAM 236 may be characterized as a "small" TCAM. It should be noted that while TCAM 236 is specifically discussed in this disclosure, other types of content addressable memory may also be used.

The host interface 219 accepts outgoing network transmissions from the host system 102 and sends them to the transmit module 225 for processing and then sending out via port 228. Incoming network transmissions are similarly accepted from the network at port 228, sent to the receive module 223, and forwarded to the host system 102 through host interface 219 by the DMA module 221. The DMA module 221, the transmit module 225, and the receive module 223 may all interact with or be controlled by processor 230 in various aspects. The DMA module 221 may be used to access a PCI-Express link (not shown) for sending and receiving information, to and from the host 102 processor via host interface 219.

In one aspect, port 228 may be a generic port (GL) and may include an N_Port, F_Port, FL_Port, E_Port, or any other port type. The port 228 may be configured to operate as FCoE, FC or Ethernet port. In other words, depending upon what it is attached to, a GL port can function as any type of port.

In one aspect, adapter 118 includes a processor or processing module 230 that may execute firmware 233 out of memory 231. In one aspect, as will be described in more detail below, the processor 230 may access hash data structures 234 out of memory and/or TCAM 236 to determine processing of network transmissions based on rules that are stored therein. The term data structure as used herein includes tables or other formats in which information can be stored. Details regarding hash data structures 234 and TCAM 236 are provided below.

In one aspect, firmware 233 may include an optimization module 232 as described in more detail below. In other aspects, an optimization module 232 may be a separate component that may interact with processor 230, hash data structures 234, and/or TCAM 236. In one aspect, optimization module 232 processes a set of network transmission rules to create one or more hash data structures 234 and optimize the use of TCAM 236.

Figure 3:
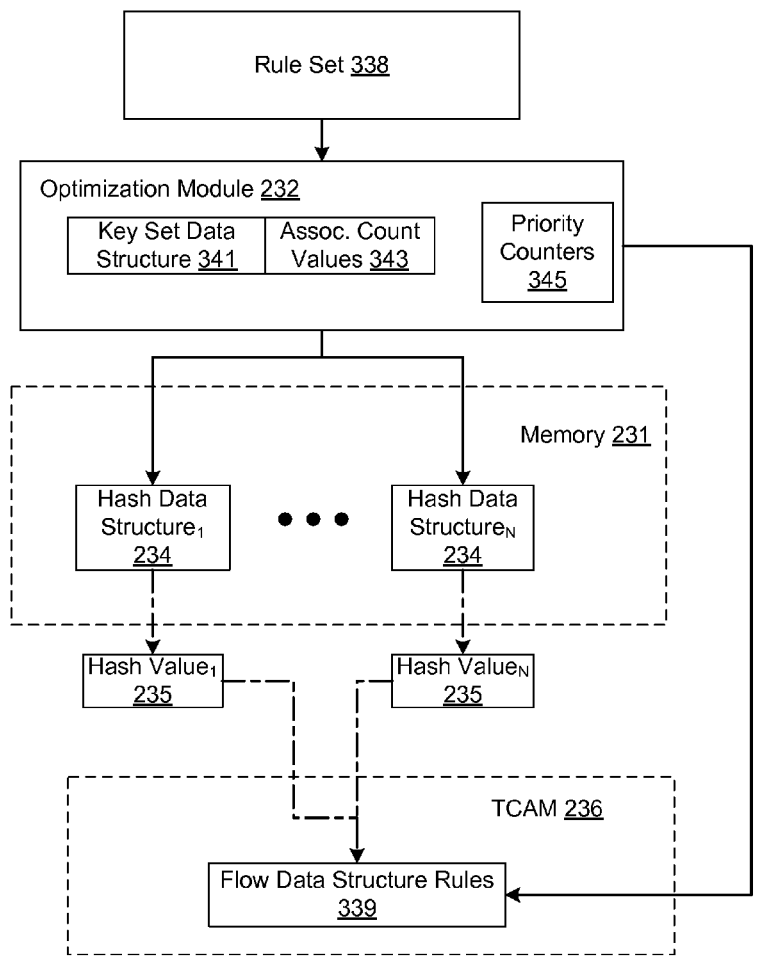
FIG. 3 is an architectural block diagram for routing, according to the various aspects of the present disclosure.

FIG. 3 shows an example of the optimization module 232, according to one aspect. In one aspect, the optimization module 232 takes a network transmission rule set 338 as input, processes it through the use of a key set data structure, such as a key set data structure 341, associated counters 343, and one or more priority counters 345, and outputs one or more hash data structures 234 and a set of flow data structure rules 339, as described below in detail. In one aspect, hash data structures 234 are stored in memory 231 and while flow data structure rules 339 are programmed into the TCAM 236. Since the flow data structure rules 339 are smaller in size than the hash data structures, the TCAM size is optimized, making the design cost-effective.

In one aspect, hash data structures 234 and TCAM 236 are used by the processing module 230 to process network frames that arrive at adapter 118 (for example, through host interface 219) and determine how to forward the frames (for example, via port 228). In one aspect, the rule set 338 may be maintained and supplied by host system 102 or through another network component, such as a network set-up computing system operated by a network administrator or the like. The rule set 338 may be a complete set of rules for processing network frames and may be updated or revised in whole or in part at various times throughout the operation of adapter 118. In one aspect, for example, the rule set 338 may comprise a large flow data structure i.e. an ordered sequence of rules used to control forwarding behavior by the adapter 118.

FIG. 4 illustrates an example of a larger flow data structure such as may be found in a rule set 338. The flow data structure of FIG. 4 illustrates just a small portion of a flow data structure that would include a complete set of rules for processing network traffic. Each entry in the flow data structure has an index 340 (the rules are ordered based on a priority) and the rules may include one or more search keys 342A-N that, when matched, indicate an action 344 should be taken. FIG. 4 also illustrates explanatory notes that provide context for the reader but need not be stored in an actual flow data structure.

As illustrated in FIG. 4, search keys 342A-N include source IP (Internet Protocol) address (342A), destination IP address (342B), and Port number (shown as App Port) (342N), but others may exist that are not shown. The source IP address is the IP address of the source of a frame. The destination IP address is the IP address of a frame's destination. The port number may be a world-wide port number (WWPN) of the adapter port that sends the frame.

In the illustration, "*" entries indicate an open match. For example, index 1000 is a rule that indicates any network frame that is processed with any source IP address but a destination IP address of 13.3.5.9 will match the rule and the action will be that the network packet is denied. More specifically, this flow data structure may be an example for a portion of a network in a business environment. In this example, no packets are allowed to port 100 (index=0 rule); and no packets are allowed to blacklisted destinations (index=1 to 1000 rules). Administrators can send anything other than the above restrictions (index=1001 to 2000 rules) and employees are subject to the above restrictions, and are not allowed to send to port 80 (index=2001 to 3000 rules). In the example, no other packets are allowed (index=3001). As set forth, each blacklisted destination consumes a rule in the large flow data structure, as does each administrator and employee. The larger flow data structure 338 can easily consume tens of thousands of rules for a large network.

A single large flow data structure 338, such as that shown in FIG. 4, can provide an ordered flow search. It would be possible for a processing module 230 to search this flow data structure starting at index 0 and running down entries until a matching rule was found for how to process an incoming frame. However, such a large flow data structure will be costly in terms of either processing time or expensive in terms of memory to support fast processing (or both). For example, it may be useful to implement the entire flow data structure of FIG. 3 in TCAM 236, but it may prove cost prohibitive in at least some circumstances to program such a large data structure into expensive TCAM.

As such, in one aspect, adapter 118 includes optimization module 232 that can preprocess rule set (flow data structure) 338 and create a more efficient structure for processing module 230 to use. The flow data structure optimizer transforms the larger flow data structure of FIG. 4 into a smaller flow data structure rule set 339 for storage at TCAM 236 (see, e.g., FIG. 5C) and associated hash data structures 234 (see, e.g., FIGS. 5A-5B) for storage at memory 231 that is relatively cheaper than TCAMs. An example of a much smaller flow data structure that can be created out of the FIG. 4 flow data structure using hashing rules is shown in FIG. 5C.

FIGS. 5A-5C illustrate how the 3002 rules of FIG. 4 might be reduced to only 6 rules with two hashing functions 534A, 534B used. The flow data structure 339 of FIG. 5C includes an ordered list of rules based on an index 340, just as with FIG. 4 and may include one or more search keys 342 as before that tie to actions 344. In this instance, however, one or more of the search keys 342 will correspond to hash data structure match priorities 446A, 446B, which correspond to the hash data structure outputs of hash data structures 534A, 534B. These data structures are built by determining common sets of search keys and assigning priorities to them based on their ordering in the flow data structure of FIG. 4, as will be described in more detail below. The hash data structures 534A, 534B may have different inputs and output a match priority (446A, 446B). In one aspect, the output may further include a possible action 544A, 544B. In general, the actual use of this action in processing a network frame or transmission may rely on the TCAM action 344 result.

Returning to FIG. 3, in one aspect, rule set 338 includes rules similar to a large flow data structure 338 (such as illustrated in FIG. 4). This large flow data structure 338 is processed by the flow data structure optimizer 232 to create one or more hash data structures 234 (such as hash data structures $234_1$ to $234_N$) and associated flow data structure rules 339 that is smaller than 338. Flow data structure 338 is stored in TCAM 236, while the hash data structures 234 are stored in memory 231. The flow data structure rules 339 comprise the optimized flow data structure that may be used by processing module 230 to direct network traffic.

In one aspect, building the hash data structures (e.g., 534A, 534B) and storing an optimized flow data structure (e.g., 339) begins with first instantiating hash data structures $234_{1-N}$ for the largest groups of common key sets. In various aspects, a system designer can determine this in advance and design hash data structures (e.g., an IP destination hash data structure), or the flow data structure optimizer can count the number of rules for each common key set and instantiate hash data structures for them dynamically, based on available resources. In the particular example illustrated with FIGS. 4 and 5A-5C, there are two hash data structures (534A, 534B), but an arbitrary number of hash data structures can be used with this technique. Also, search technology other than hash data structures could be used, as long as it takes search keys as input and produces actions and match entry priority (and/or an action) as output.

Next, the flow data structure optimization module 232 processes each rule the rule set 338. The optimization module 232 determines the key set of each rule, where the key set is the set of search key types (such as source IP or destination IP) and not the search key value (like 1.1.1.1 for source IP). If the key set of the rule matches the common key set of a hash data structure, the rule is programmed into the associated has data structure. In the example of FIG. 4, rules 1-1000 share the common key set of Hash1, for example (in this case destination IP address with any source IP or port). Adjacent rules sharing a common key set (or common key priority set) will use the same match priority. In one aspect, the first common key priority set will use a match priority of 1. Subsequent common key priority sets for this hash data structure will use an increasing match priority value. As each new common key priority set is identified, one CAM entry will be written with the hash match priority field set for that priority, and the action field set to use the action for that hash. This single CAM entry represents all rules of that common key priority set. If the search key set of a rule does not match the common key set of any hash data structure, the flow data structure optimizer will write one CAM entry for that rule.

Once all rules of the larger flow data structure have been processed, the optimized flow data structures ready for use. The operation of the efficient hash data structure/TCAM combination setup is illustrated generally in FIG. 3 with the dashed arrows. To search the efficient flow data structure, search keys are presented to the hash data structures $234_{1-N}$. The hash data structures each produce a hash match entry priority value $235_{1-N}$. In one aspect, the hash data structure output may also include a hash data structure action (described in more detail below with respect to FIGS. 5A-5B). Hash match entry priority values $235_{1-N}$ and search keys are presented to the TCAM 236 to search the flow data structure rules 339. The TCAM 236 will ignore search keys it is not using. The TCAM will perform a lookup using the hash match entry values $235_{1-N}$ and active search keys, and will return the actions of the first matching TCAM entry. If specified in the TCAM action field, one of the hash data structure actions may be used to process the network transmission.

Figure 6A:
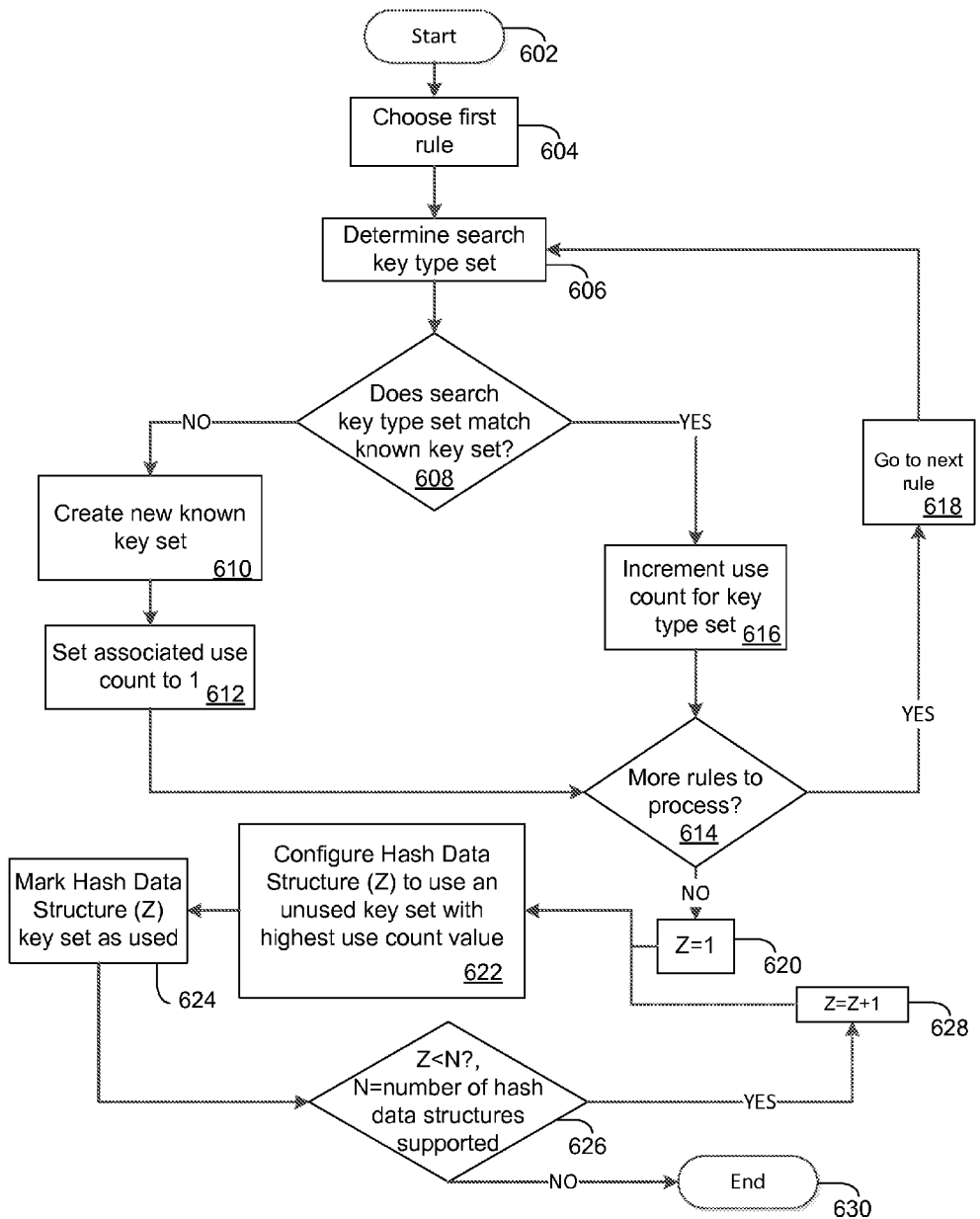
FIGS. 6A-6B illustrate example process flow diagrams for optimizing flow data structures, according to the various aspects of the present disclosure.
Figure 6B:
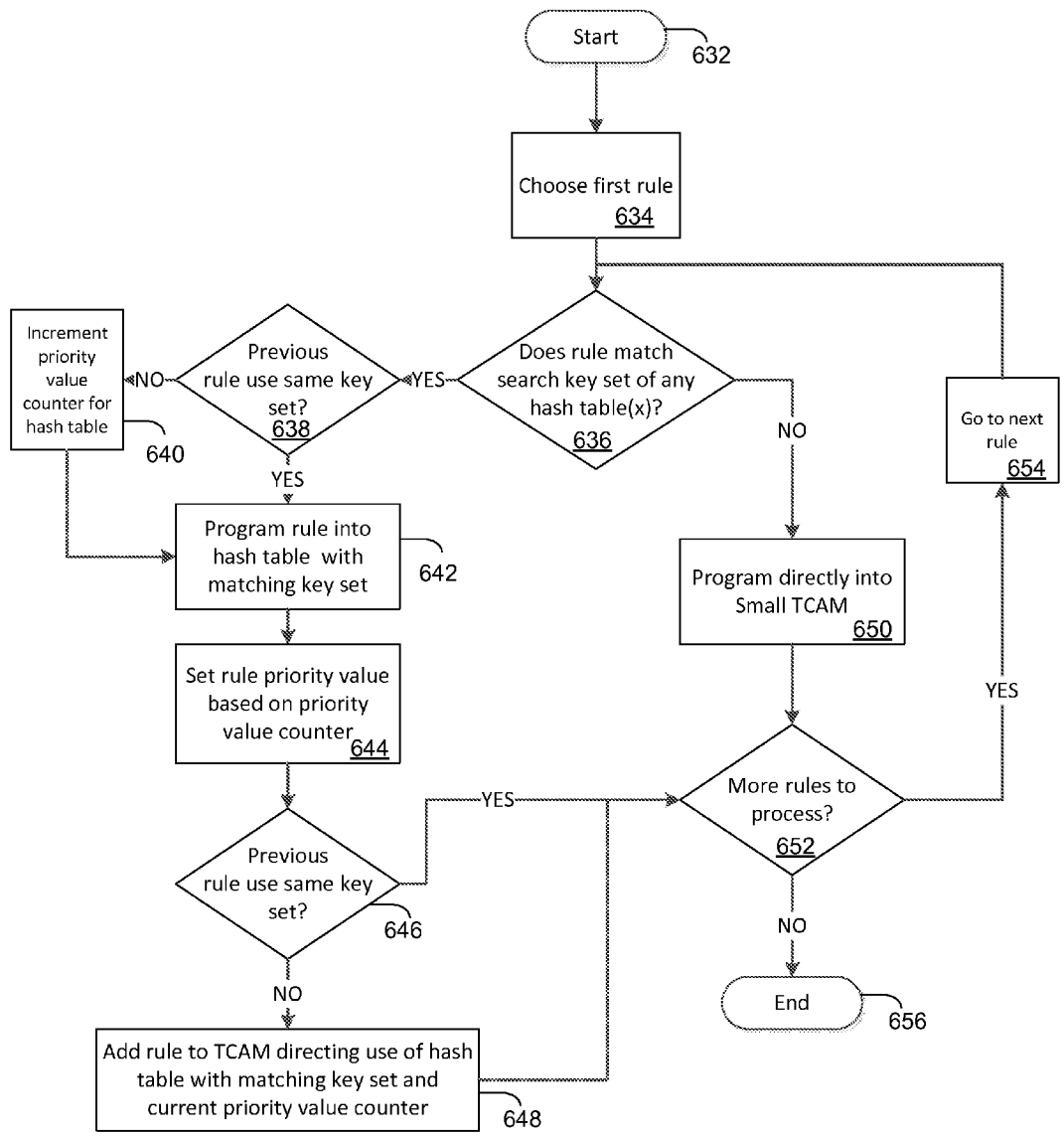

Turning to FIGS. 6A-6B, a process for generating optimized network routing rules is described in detail, according to one aspect. Starting with FIG. 6A, the optimization module 232 reviews the rule set 338 in order to select the hash data structures that will be used in a dynamically chosen process. The process starts at block 602. At block 604 a first rule from the rule set 338 is selected. At block 606, the rule is analyzed to determine a search key type set. In the example of FIG. 4, the first rule (index=0) uses the "app port" as a search key type.

In block 608, the optimization module 232 determines if the search key type set is one that is known. In one aspect, the set of known key sets may be stored in a data structure such as key set data structure 341 (FIG. 3). When the first rule is being processed, generally there will be no entries in the key set data structure 341, so it will not be known. When it is not a known key type set, the process continues to block 610, where the key type set is created as a known type set (such as by adding it to the key set data structure 341). In block 612, a rule count associated with the new key type set is set to 1 (such as in a data structure shown as associated count values 343 in FIG. 3) to indicate that there is one rule that uses that known key type set.

At block 614, the optimization module 232 determines if there are more rules to process. When there are, the optimization module 232 selects the next rule in block 618 and returns to block 606 to determine the search key type set for that rule. With the example of FIG. 4, the second rule (index=1) would also be a new key type set, because this rule uses destination IP address.

When the optimization module 232 does recognize a rule's key type set at block 608 (such as when processing FIG. 4's rule index=2), the process goes to block 616 where the count associated with that key type set is incremented. As described, in one aspect, this may be handled through searching the key set data structure 341 and incrementing associated count values at 343 appropriately. The process then proceeds to block 614 to determine if more rules need to be processed. One will recognize that this looped process determines what key type sets are used by different rules and also determines which rule key type sets are used by the most rules. Once all of the rules have been processed, the key set data structure 341 will have an entry for each known key set and there will be an associated count for how often those key sets are used by rules in associated count values 343 maintained by the optimization module 232 (at least during the optimization process). In some aspects, this data may be stored more permanently (such as in memory 331) to help shortcut processing if rule set 338 gets additional rules or is otherwise revised.

Once the most used key sets are known through the counting process above, the hash data structures are set up for the most prevalent key sets. Moving from block 614 to block 620, the first hash data structure is set up. At block 620, an index is set to 1 for the first hash data structure. At block 622, the optimization module 232 configures the first hash data structure 234 (Hash Data Structure (1)) to use the unused key set with the highest rule count value (such as from associated count values 343). At block 624, the optimization module 232 then marks that key set as used. In one aspect, this may be done by changing the associated count value for that key set to 0 or a negative number, thereby making the next highest count value an indicator of the next key set to use. The process then continues to block 626 to determine if more hash data structures are supported. If the total number of hash data structures supported=N and the index=Z, then if Z<N, more hash data structures are supported. At block 628, the index, Z, is incremented, and the optimization module 232 returns to block 622 to set up the next hash data structure 234 (Hash Data Structure (Z)). When all of the supported hash data structures have been set up, the process proceeds from block 626 to end at block 630.

Once the hash data structures are configured, such as by the process of FIG. 6A, the rule set 338 can be programmed into the optimized data structures (the one or more hash data structures 234 and the flow data structure rules 339 of TCAM 236, in one aspect). In one aspect, the optimization module 232 follows the process illustrated in FIG. 6B to accomplish this task. The process, as illustrated, starts at block 632, and the first rule from rule set 338 is selected at block 634 (for example, rule index=0 at FIG. 3). At block 636, the optimization module 232 determines if the rule's search key set matches any of the hash data structures 234. If it does, the process continues with block 638. It if does not, the process continues to block 650. In the case of the first rule from FIG. 3, the search key set will not match one of the hash data structures. Therefore at block 650, the rule would be programmed directly into the flow data structure rules 339 of TCAM 236. This can be seen as the index=0 rule in FIG. 5. The process proceeds to block 652, where the optimization module 232 determines if there are more rules to process. If there are, the process continues at block 654 where the next rule is selected and the process returns to block 636. If there are no more rules to process at block 652, then the process ends at block 656.

Returning to block 636, when the optimization module 232 determines that a rule does match the search key set of one of the hash data structures 234, the process continues to block 638. For example, the rules of FIG. 3 with index=1 to 1000 all have a common key set that would match to a hash data structure.

At block 638, the optimization module 638 checks to see if the current rule uses the same key set as the prior rule (if there was a prior rule processed). When it does, the process continues to block 642, where the optimization module programs the rule into the hash data structure with the matching key set.

At block 644, the rule priority value is set based on a priority value counter, which may be maintained by optimization module in priority counters data structure 345. In the aspect as shown, each hash data structure will have its own priority value counter. Each set of contiguous rules with the same key set will be considered one priority. When a second (or third, etc. . . . ) set of rules is located with the same key set, the priorities of those rules are lower (which is illustrated by a higher priority value in the examples described herein).

At block 646, the optimization module 232 determines if the previous rule used the same key set. If it does, then the current rule is in the middle (or at the end) of a rule block and nothing more is required for that rule.

The process proceeds to block 652 to determine if there are more rules to process. However, if the previous rule does not use the same key set, then the optimization module has come across a new rule block. At block 648, the optimization module 232 will add a rule to the TCAM that directs use of the appropriate hash data structure with the current priority value counter. The process will then proceed to block 652.

Returning to block 638, if the previous rule does not use the same key set as the current rule being processed, the process continues to block 640 where the optimization module will increment the priority value, such as in data structure 345, for the appropriate hash data structure—the appropriate hash data structure being the one that is associated with the current rule, then continue to block 642. It may be noted that both block 638 and block 646 make the same inquiry. It should thus be noted that in other aspects, blocks 640 and 648 may be triggered by the same inquiry (block 638, for example) with the process returning to block 642 after block 648. Other manipulations, in various aspects, would allow certain steps to be carried out in different orders or to have some steps carried out simultaneously such as through multiple processors and/or multiple threads.

Once all of the rules have been processed as in FIG. 6B, the optimized hash data structures $234_{1-N}$ and optimized flow data structure rules 339 of the TCAM 236 are ready to be used by processing module 230 to determine the appropriate rule to apply to network transmission frames. An example of this process is illustrated in FIG. 7 and described below.

The process of FIG. 7 starts at block 760 when the processing module 230 has received a network packet for processing, such as from port 228. At block 762, the processing module 230 generates base search keys by analyzing the packet fields, for example. At block 764, the processing module 230 performs a search of hash data structure $234_1$. At block 766, the processing module 230 determines if there is a match. When there is a match, the processing module reads the hash data structure $234_1$ match priority for the matched hash entry at block 768. If there is no match, the processing module sets the hash match priority for the hash data structure to 0 at block 770. In either case, the processing module 230 proceeds to block 772 and performs $hash_N$ search (es) for hash data structure(s) $234_N$ using appropriate search keys. As before, when there is a match, the processing module 230 reads the $hash_N$ match priority for the matched hash entry (block 776), and, when there is no match, the processing module 230 sets the $hash_N$ match priority to 0 (block 778). It should be understood that blocks 764-778 indicate that each hash data structure $234_{1-N}$ should be searched for matching priorities; as such there may be more steps than shown if there are three or more hash data structures. In some aspects, the hash data structures $234_{1-N}$ may be processed in parallel which generally will improve performance over sequentially processing the hash data structures.

The process then continues to block 780, where the TCAM 236 (or any other CAM) is searched using base search keys and the hash data structure matching priorities. At block 782, the processing module 230 determines if the CAM search result is Use_Hash1_Action (or other indication to use that $hash_1$ data structure to determine the action). If yes, the process continues to block 784 where the incoming packet or frame is routed based on $hash_1$ actions. If not, the process continues to block 786, where the CAM result is tested to see if it is Use_$Hash_N$_Action and, if so, the action is carried out for the packet at block 788 by using the output of one of the hash data structures. Again, as with the discussion before, blocks 782-788 generally indicate that each hash data structure may include instructions for routing the packet or frame. In the example of FIGS. 4 and 5A-5C, hash data structure 534B includes the actions for index=2 and index=4 TCAM entries. If there is no hash action for that TCAM entry, then the TCAM 236 will include the action directly, such as "DENY" with respect to index=0, 1, 3, and 5 rules of FIG. 5C.

With these processes, hash data structures 234 and the flow data structure 339 of TCAM 236 can replace a much more cumbersome rule set 338 and potentially provide more efficient processing with reduced expensive CAM resources. As described, the CAM resources would only need to be big enough to handle a small number of flow data structure rules, perhaps less than 100 even in a large network that may actually utilize thousands or tens of thousands of flow data structure rules in a conventional. Additionally, the hash data structure searching, even if implemented in slower, less expensive resources—such as RAM, is typically more efficient to search than an extremely large CAM, due—at least in part—to the high power consumption of CAMs and the large die area that such a CAM would require in an ASIC.

It should be noted that the processes of FIGS. 6A, 6B, and 7 are examples only and other similar methods of setting up and using the hash data structures and TCAM are possible without deviating from the ideas of the present disclosure. In various aspects, the hash data structures 234 may be determined by an administrator or other user or may be determined dynamically. In some aspects, when the hash data structures are determined dynamically, the hash data structures and TCAM may be reconfigured after a programmed number of rule changes, periodically, combinations of the same, and the like. Additionally, while the processes here are generally described with respect to optimizing the number of rules required in a CAM, hash data structures may also—or alternatively—be set up to help minimize the "width" of CAM data structures. For example, when there is one or more large search key types used, searches that use these keys may be more optimally implemented in RAM. As an example, if IPv6 addressing is implemented, an address search key would mean that search entries were 128 bits "wide." In some aspects, it may be more efficient to implement such "wide" search keys in the hash data structures. Other choices may also be made in optimizing the networking rule sets.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for processing network packets, comprising:
   determining common key type sets from a plurality of network processing rules;
      wherein determining the common key type sets from the plurality of network processing rules comprises:
         determining a first key type set from one of the plurality of network processing rules;
         comparing the first key type set to a set of known key type sets;
         when the first key type set is found as a known key type set, incrementing a counter associated with the known key type set; and
         when the first key type set is not found as a known key type set, adding the first key type set to the known key type set and associating a new counter value with the first key type set;
   creating one or more hash data structures using the most common key type sets;

programming network processing rules that use the most common key type sets into the one or more hash data structures;

programming remaining network processing rules into a content addressable memory (CAM); and using the one or more hash data structures and the CAM to find an appropriate network processing rule to process a network packet.

2. The method of claim 1, further comprising:
programming at least one rule into the CAM directing matches to use an action output of an associated hash data structure of the one or more hash data structures.

3. The method of claim 2, wherein the one or more hash data structures outputs at least one hash data structure priority value and the hash data structure priority value is used as a search key in the CAM.

4. The method of claim 1, wherein the CAM is a ternary content addressable memory (TCAM).

5. The method of claim 1, wherein the hash data structures are implemented in a different memory type than the CAM.

6. The method of claim 1, wherein determining the common key type sets further comprises: processing a key type set for each of the plurality of network processing rules.

7. The method of claim 6, wherein creating one or more hash data structures using the most common key type sets uses counters associated with the set of known key type sets to determine the most common key type sets.

8. A network device for processing network transmissions, the device comprising:
a processing module for processing the network transmission;
a content addressable memory (CAM);
a memory type different from the CAM for storing a set of one or more hash data structures, the one or more hash data structures outputting hash data structure priority values and action indications;
wherein the CAM and the one or more hash data structures share a network transmission processing rule set; and
wherein the processing module searches the set of one or more hash data structures and uses the output hash data structure priority values to search the CAM to determine how to handle the network transmission and processes the network transmission according to the determination;
wherein processing of the network transmission according to the determination comprises:
processing the network transmission according to an action output of a first hash data structure when a CAM search result indicates a first hash data structure action:
processing the network transmission according to an action output of a second hash data structure when a CAM search result indicates a second hash data structure action; and
a processing the network transmission according to a rule coded in the CAM when the CAM search result does not indicate a first hash data structure action or a second hash data structure action.

9. The network device of claim 8, wherein the CAM is a ternary CAM (TCAM).

10. The network device of claim 8, further comprising an optimization module, the optimization module adapted to process a set of network processing rules to create the set of one or more hash data structures and populate the CAM with the hash data structure priority values as search keys to locate a portion of the transmission processing rule set.

11. The network device of claim 10, wherein the optimization module populates at least one of the set of one or more hash data structures based on the most common search key set in the set of network processing rules.

12. The network device of claim 10, wherein the optimization module reprocesses the set of network processing rules to create the set of one or more hash data structures and populate the CAM with a portion of the transmission processing rule set after receiving a determined number of changes to the set of network processing rules.

13. The network device of claim 10 wherein the optimization module populates at least one of the set of one or more hash data structures based in part on a widest search key in the set of network processing rules.

14. A machine-implemented method for processing a network transmission, comprising:
accepting an incoming network transmission at a network device, the network transmission including one or more packet fields;
generating packet search keys based on the one or more packet fields;
performing a search of a first hash data structure using at least some of the packet search keys as defined by the first hash data structure and reading a match priority when there is a hash data structure match;
searching a content addressable memory (CAM) using at least the match priority as an input; and
processing the network transmission according to the result of the CAM search;
wherein processing the network transmission according to the result of the CAM search comprises:
processing the network transmission according to an action output of the first hash data structure when the CAM search result indicates a first hash data structure action;
processing the network transmission according to an action output of the second hash data structure when the CAM search result indicates a second hash data structure action; and
processing the network transmission according to a rule coded in the CAM when the CAM search result does not indicate a first hash data structure action or a second hash data structure action.

15. The method of claim 14, further comprising:
performing a search of a second hash data structure using at least some of the packet search keys as defined by the second hash data structure and reading a second match priority when there is a second hash data structure match;
wherein the searching of the CAM further uses the second match priority as another input.

16. The method of claim 14, wherein the CAM includes a flow data structure.

17. The method of claim 14, wherein the CAM is a ternary content addressable memory (TCAM).

18. The method of claim 14, wherein the hash data structures are implemented in a different memory type than the CAM.

* * * * *